(12) United States Patent
Maple

(10) Patent No.: US 6,641,952 B2
(45) Date of Patent: Nov. 4, 2003

(54) BATTERY ARRANGEMENT FOR REDUCING BATTERY TERMINAL CONTACT RESISTANCE STEMMING FROM INSULATING CONTAMINANT LAYER ON SAME

(75) Inventor: Larry E Maple, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 09/838,977

(22) Filed: Apr. 20, 2001

(65) Prior Publication Data

US 2002/0155344 A1 Oct. 24, 2002

(51) Int. Cl.⁷ ................................................ H01M 2/30
(52) U.S. Cl. ...................................... 429/157; 429/178
(58) Field of Search ................................ 429/157, 158, 429/160, 168, 178

(56) References Cited

U.S. PATENT DOCUMENTS 5,486,432 A * 1/1996 Sharrah et al. ............... 429/99

* cited by examiner

Primary Examiner—Randy Gulakowski
Assistant Examiner—Monique Wills

(57) ABSTRACT

A battery arrangement that minimize battery-to-battery and battery-to-device contact resistance by rupturing or removing an insulating contaminant layer on portions of battery terminals that contact each other or that contact contacts in a battery compartment. Generally, standard dry cell and miniature batteries are arranged such that the surface area of the terminals that contact other terminals or device contacts is reduced. A given compression force applied to the serially-aligned batteries in the battery compartment results in a contact pressure sufficient to rupture the insulating contaminant layer at the terminal region that contacts the adjacent terminal or device contact. A relative lateral motion can be imparted between adjacent batteries and/or a battery and device contact to facilitate the removal of the insulating contaminant layer.

20 Claims, 11 Drawing Sheets

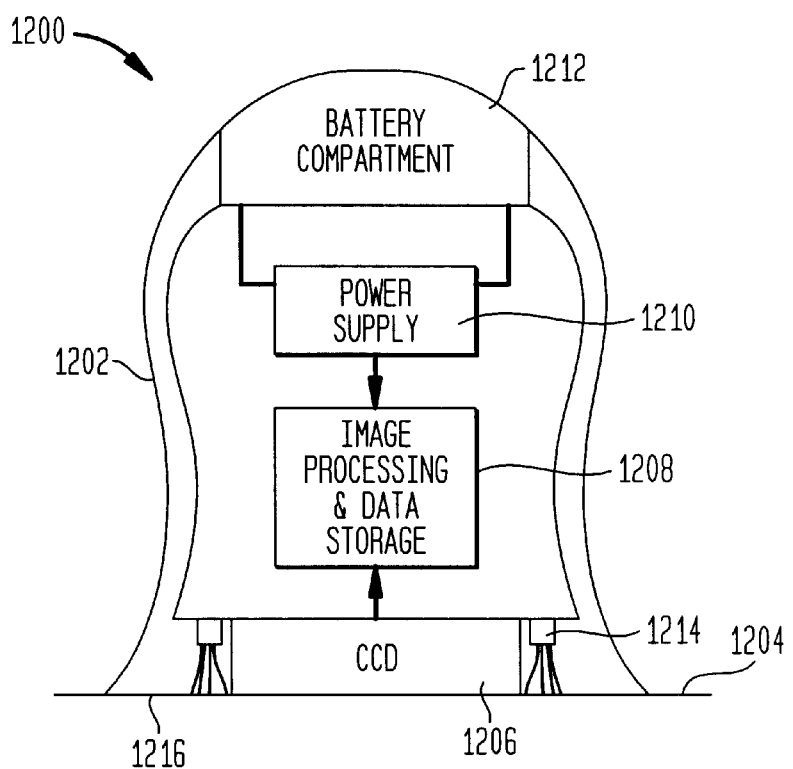

BATTERY ARRANGEMENT FOR REDUCING BATTERY TERMINAL CONTACT RESISTANCE STEMMING FROM INSULATING CONTAMINANT LAYER ON SAME

RELATED APPLICATION

The present application is related to the following commonly owned U.S. patent application:

U.S. patent application entitled "CONICAL COILED SPRING CONTACT FOR MINIMIZING BATTERY-TO-DEVICE CONTACT RESISTANCE STEMMING FROM INSULATING CONTAMINANT LAYER ON SAME," naming as inventor Larry E. Maple.

BACKGROUND OF THE INVENTION

1. Field of the Invention

The present invention relates generally to batteries and, more particularly, to decreasing battery terminal contact resistance attributable to the presence of an insulating contaminant layer on the battery terminals.

2. Related Art

Electrical devices commonly derive their power by way of one or more batteries that are housed within a compartment associated with the electrical device. The battery compartment typically is integral with the electrical device. Alternatively, the battery compartment can be provided remotely from the electrical device with a connection thereto via conductor elements such as electrical wires.

There are numerous types of primary (non-rechargeable) and secondary (rechargeable) batteries. Dry cell batteries are commercially available in a number of well-known sizes and configurations such as the standardized AAA, AA, C, and D battery sizes. Miniature batteries, also referred to as watch, disc, dish, and button batteries, are also available in standard sizes and are commonly used in hearing aids, electric wristwatches and other devices.

Dry cell battery compartments have a positive contact, commonly in the form of a planar tab or a conical coiled spring, for electrically contacting the negative terminal of an installed dry cell battery. A negative contact, commonly in the form of a planar tab, is provided in the compartment for electrically contacting the positive terminal of an installed dry cell battery. Planar and dimpled tabular contacts are commonly used in miniature battery compartments. When one or more batteries are installed in such battery compartments, the device serves as an electrical load placed across the terminals of the installed batteries.

In compartments that require more than one dry cell battery, the batteries are housed in a series or parallel arrangement. In a series arrangement, the batteries are positioned "head to tail" with the planar surface of the positive terminal button abutting the negative terminal surface of the forward adjacent battery, with the batteries having parallel or coexistent longitudinal axes; that is, the batteries form a straight line. As a result, batteries arranged in this manner are said to be "linearly aligned".

A well-documented problem with standard dry-cell, miniature and other types of batteries is the oxidation and sulfidation of the battery terminals. Oxide and sulfide layers often develop with time such as from when the batteries are manufactured to when they are ultimately used. In addition, galvanic corrosion of the battery terminals can occur in certain circumstances and environments. These oxide, sulfide and corrosive films are surface contaminants that insulate the battery terminal. Of particular relevance to the present invention is the increased battery contact resistance caused by this insulating contaminant layer. Contact resistance is the electrical resistance in the battery circuit attributable to the physical contact between adjacent batteries and between the batteries and the device. In circumstances in which the terminals have an insulting contaminant layer, the contact resistance can be significant, consuming valuable battery power, particularly in high current applications. This results in the rapid depletion of the installed batteries decreasing device availability and increasing the rate at which the batteries need to be replaced or recharged. Furthermore, such a high contact resistance decreases the maximum current available from the installed batteries, making certain battery arrangements unsuitable for use in high current devices.

For example, two 1.2-volt dry cell batteries arranged in series provide 2.4 volts. In a high current application of 5 amperes, the batteries deliver 12 watts of power. If the contact resistance increases from a nominal 0.06 ohms to 0.2 ohms due the presence of an insulating contaminant layer on one or more of the battery terminals, the power consumed overcoming the contact resistance increases from 1.5 to 5 watts. In other words, 40% of the available power is consumed by the contact resistance. This reduces the power and current available to the device. In addition, the lost power essentially heats the battery terminals and/or device contacts. This can damage or degrade the batteries, damage the battery compartment and increase the risk of fire.

One traditional approach to solving this problem has been to provide the operator with a separate dimpled piece of sheet metal to insert between neighboring linearly aligned batteries. This approach has some drawbacks. For example, the additional part increases product cost. It also adds complexity, making it difficult for the user to install quickly and easily the batteries. The user must install a first battery, position the sheet metal intermediate contact in the proper position, and then insert the second battery while retaining the sheet metal in its proper position. Thus, such supplemental parts are often used improperly or misplaced or lost and not used at all.

An insulating contaminant layer on the battery terminal also increases the contact resistance between the batteries and device. For example, the first battery in a series battery arrangement is positioned with the planar surface of its positive terminal button parallel to and in contact with a planar negative tab contact of the device. The last battery in the series battery arrangement is positioned such that its planar negative terminal surface is parallel to and in contact with a planar conical coiled spring winding or contact tab. Conventional conical coiled spring contacts have a series of helical windings, with the upper winding residing in a plane substantially parallel to and in contact with the negative battery terminal surface. Similarly, in parallel arrangements, the batteries are each positioned with their positive and negative terminals contacting the opposing polarity contacts of the battery compartment in a similar manner. The planar tab and planar conical coiled spring winding can not penetrate the insulating contaminate layer coating the battery terminals.

SUMMARY OF THE INVENTION

The present invention is directed to a battery arrangement for two or more standard dry cell or miniature batteries. The batteries are serially-aligned with their respective longitudinal axes intersecting at an angle which causes the batteries to contact each other with a minimal accessible surface area of at least one of the terminals, such as the edge of a positive terminal button edge of a dry cell battery or an edge of the positive terminal casing of a miniature battery. The battery arrangement of the present invention minimizes the contact surface area between contacting terminals of adjacent batteries, thereby maximizing, for a given compression force, the localized contact pressure between those batteries. This advantageously ruptures or removes substantially any insulating contaminant layer disposed on the contacting regions of the battery terminals thereby reducing battery-to-battery contact resistance. Another advantage of the present invention is that the user does not have to perform any action or use any additional components such as additional springs or dimple sheets to achieve this significant reduction in contact resistance.

A number of aspects of the invention are summarized below, along with different embodiments that may be implemented for each of the summarized aspects. It should be understood that the embodiments are not necessarily inclusive or exclusive of each other and may be combined in any manner that is non-conflicting and otherwise possible regardless of which aspect of the invention they are associated with. It should also be understood that these summarized aspects of the invention are exemplary only and are considered to be non-limiting.

In one aspect of the invention, a battery compartment is disclosed. The battery compartment is configured such that opposing polarity terminals of adjacent batteries contact each other. The batteries are arranged such that a region of one of the terminals that defines a minimum accessible portion of the terminal surface area is the only point of contact between the contacting terminals.

In another aspect of the invention, a battery compartment is disclosed. The battery compartment stores at least two batteries each having a casing with positive and negative terminal surfaces disposed on opposing ends of the battery casings and transected by a longitudinal battery axis substantially orthogonal to each terminal surface. The installed batteries are serially aligned in terminal contact with each other such that their respective longitudinal axes intersect.

In a further aspect of the invention, a battery-powered device is disclosed. The battery-powered device includes a battery compartment for electrically connecting at least two standard dry cell batteries in a serially aligned arrangement. Each dry cell battery includes a positive terminal button with a planar top surface and edges around the periphery thereof. The batteries are arranged such that only the edge of the positive terminal button of a battery in a second series battery position contacts a planar surface of a negative terminal of a battery in a first series battery position.

BRIEF DESCRIPTION OF THE DRAWINGS

The foregoing and other features and advantages of the present invention will be understood more clearly from the following detailed description and from the accompanying figures. This description is given by way of example only and in no way restricts the scope of the invention. In the drawings, like reference numerals indicate identical or functionally similar elements. Additionally, the left most one or two digits of a reference numeral identify the drawing in which the reference numeral first appears. In the figures:

FIG. 12 is a schematic block diagram of a hand-held scanner having a battery compartment in accordance with one embodiment of the present invention.

DETAILED DESCRIPTION

I. Introduction

Figure 1A:
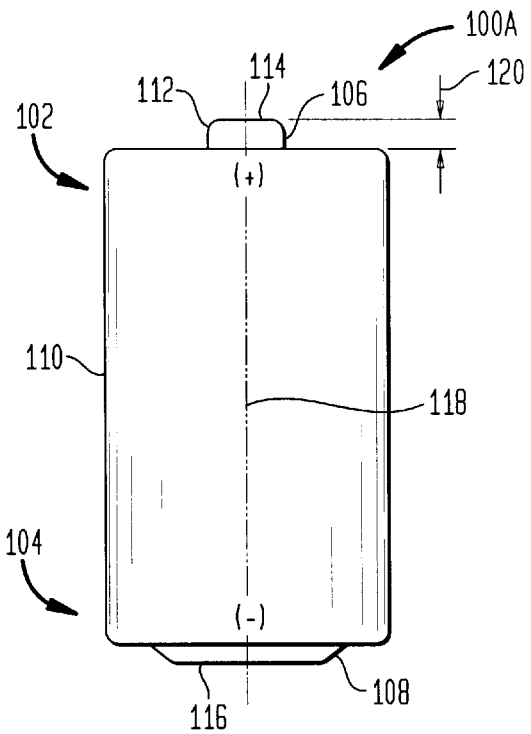
FIGS. 1A and 1B are schematic side views of two prior art dry cell batteries that can be arranged in accordance with embodiments of the present invention.

The present invention is directed to methods and apparatus that minimize battery-to-battery and battery-to-device contact resistance by rupturing or removing an insulating contaminant layer disposed on the portions of the battery terminals that contact each other or that contact the contacts of a battery compartment. Specifically, the present invention arranges standard dry cell and miniature batteries such that a minimum surface area of the terminals contacts of an adjacent battery terminal or device contact. A given compression force applied to the serially-aligned batteries in the battery compartment results in a maximum contact pressure sufficient to rupture the insulating contaminant layer disposed on the surface of the abutting battery terminals and/or abutting battery terminal and device contact. Preferably, a relative lateral motion is imparted between adjacent batteries and/or a battery and device contact when the batteries are installed in the battery compartment to facilitate the penetration of the insulating contaminant layer.

The disclosed embodiments of the present invention are directed to a battery arrangement for two or more standard dry cell or miniature batteries with their respective longitudinal axes intersecting at an angle which causes the batteries to contact each other with a minimal accessible surface area of at least one of the terminals, such as the edge of a positive terminal button of a dry cell battery or an edge of the positive casing of a miniature battery. Providing battery-to-battery and battery-to-device contact at only this terminal edge region minimizes the contact surface area and maximizes the localized contact pressure. This ruptures the insulating contaminant layer on the contacting terminal regions thereby reducing contact resistance attributable thereto. Importantly, the resulting decrease in contact resistance is achieved without reconfiguring the batteries; that is, standard, commercially available batteries are used, and without using additional components such as springs or dimple sheets.

The present invention is also directed to a conical coiled spring battery contact for use in a battery compartment. The conical coiled spring contact is configured with an upper end turn that is bent to form one or more terminal contact regions having a minimal surface area for contacting a terminal of an abutting battery. The contact region(s) each provide, for a given compression force, a contact point that imparts a pressure sufficient to rupture an insulating contaminant layer on the abutting battery terminals. Preferably, the conical coiled spring contact has an axis of rotation defined by the windings with the terminal contact point(s) laterally offset from the axis. This causes regions of the windings in this lateral direction to compress more that other regions of the windings in response to an axial compression force applied by an abutting battery. This in turn causes the terminal contact point(s) to shift further in the lateral direction as the contact spring is compressed. As this occurs, the terminal contact point(s) scrape against the terminal of the installed battery, removing substantially any insulating contaminant layer disposed on the battery terminal.

II. Battery Description

A battery, sometimes referred to as an electric cell, is a device that converts chemical energy into electricity. As used herein, a battery can consist of one cell alone as well as two or more cells connected in series or parallel within a single casing. Each cell consists of a liquid, paste or solid electrolyte, a positive electrode and a negative electrode. The electrolyte serves as an ionic conductor; one of the electrodes reacts with the electrolyte to produce electrons while the other electrode accepts the electrons. When connected across a load, such as when installed in a device battery compartment, this reaction causes current to flow from the battery and power to be consumed. Although the present invention can be applied to and operate with many types of rechargeable and nonrechargeable batteries, the present invention, solely for the ease of understanding, will be discussed in connection with two of the more common types of batteries, dry cell batteries and miniature batteries. Such batteries have different chemistries such as Lithium Ion, Nickel Cadmium, Nickel Metal Hydride, rechargeable alkaline, and others.

A. Dry Cell Batteries

Figure 1B:
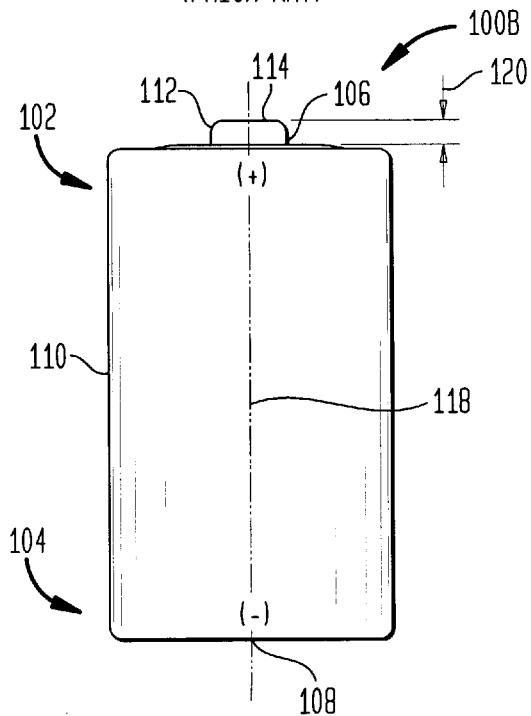

A perspective view of two commonly available, standard dry cell batteries is provided in FIGS. 1A and 1B. Dry cell batteries 100A and 100B are collectively and generally referred to as dry cell batteries 100 or, simply, battery or batteries 100. Dry cell batteries 100 can be either primary or secondary batteries. Primary batteries are batteries in which the electrolytes cannot be reconstituted into their original form once the energy stored in the battery has been converted into a current; that is, they are non-rechargeable. Primary battery cells were originally referred to as a Leclanche cell in honor of its inventor, French chemist Georges Leclanché who invented the dry cell battery in the 1860's. Other names given to this type of battery include, for example, a flashlight battery, a voltaic battery, an alkaline battery, etc. Dry cell batteries 100 can also be secondary batteries. Secondary batteries can be recharged by reversing the chemical reaction in the battery; that is, they are rechargeable. Such a battery was invented in 1859 by the French physicist Gaston Planté. The chemical composition of rechargeable and non-rechargeable dry cell batteries 100, some of which are noted above, are well known and not described further herein.

The size and configuration of primary dry cell batteries and, more recently, secondary dry cell batteries are specified by ANSI standards, and are commercially available in the standardized AAA, AA, C, and D battery sizes. As such, a common feature of all such dry cell batteries 100 is its configuration. FIGS. 1A and 1B are side views of two prior art dry cell batteries 100A and 100B that satisfy the specifications for a "C" size dry cell battery. Dry cell batteries 100 includes a cylindrical shell or casing 108 defining a head region 102 and a tail region 104. A positive terminal 106 is disposed at head region 102 while a negative terminal 108 is disposed at tail region 104. The internal configuration and chemistry of dry cell batteries 100 varies, and is well known in the art. However, in all cases, positive terminal 106 is a formed cylindrical protrusion extending from casing 110, commonly referred to as a button. Terminal button 106 has a curved or parabolic edge 112 while the top surface 114 of positive terminal button 106 is substantially planar. A longitudinal axis 118 extends through batteries 100 from negative terminal 108 to positive terminal 106. Planar surfaces 116 and 114 are orthogonal to longitudinal axis 118. The height or thickness 120 of positive terminal button 106 varies, as shown by the two illustrative batteries 100A and 100B.

Examples of the above batteries are available from Duracell, Inc., and Eveready Battery Company, Inc. DURACELL® batteries are described in detail at www.duracell.com, while the EVEREADY® batteries are described in detail at www.evereadv.com. (DURACELL is a registered trademark of Duracell Inc., a division of The Gillette Company. EVEREADY is a registered trademark of the Eveready Battery Company, Inc.) Because the dimensions of these and other dry cell batteries have been standardized and are specified by ANSI standards, the dimensions of such batteries will be substantially the same, within the specified tolerances, regardless of manufacturer.

B. Miniature Batteries

Figure 2A:
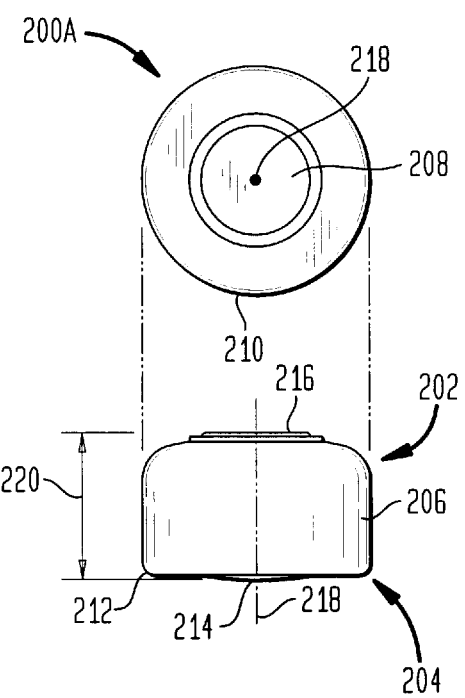
FIGS. 2A and 2B are schematic side views of two prior art miniature batteries that can be arranged in accordance with embodiments of the present invention.
Figure 2B:
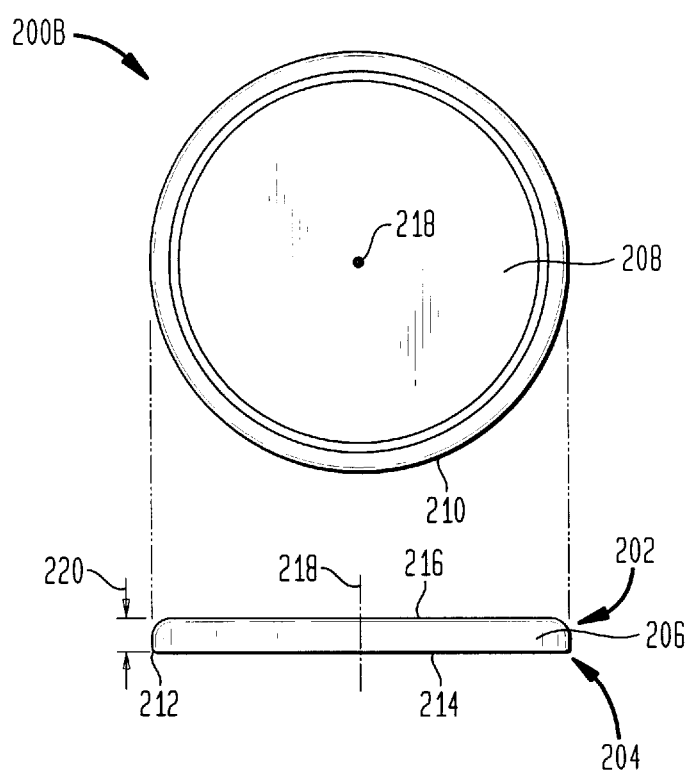

FIGS. 2A and 2B are top and side views of two embodiments of another common battery in use today, referred to herein as a miniature batteries 200 (collectively and generally referred to as miniature battery 200 or, simply, battery or batteries 200). Miniature battery 200 is also referred to as a watch, coin, button, disc, dish and mercury battery. Today, miniature battery 200 is commonly available in chemistries such as mercury, lithium and manganese dioxide, silver oxide, and others.

Miniature batteries 200 are made in the shape of a small flat disk for use in, for example, hearing aids, photoelectric cells and electric wristwatches. A miniature battery 200 includes a disc-shaped shell or casing 210 defining a head region 202 and a tail region 204. A positive terminal 206 is located at tail region 204 while a negative terminal 208 is located at head region 202. The internal configuration of miniature batteries is considered to be well known in the art and is not described further herein. The height or thickness 220 of miniature batteries 200 varies, as shown by the two illustrative batteries 200A and 200B. Negative terminal 208 may be a small cylindrical raised surface, as shown on battery 200A, or it may be flush with the surface, as in battery 200B. In battery 200B, negative terminal 208 does not extend to the periphery of battery casing 210. As shown in the top view, it is a substantially circular region with a diameter slightly less than the diameter of battery casing 210. As with dry cell batteries 100, the top surface 216 of negative terminal 208 and the surface 214 of positive terminal 206 are substantially planar. Each battery 200 has an axis 218 through its center, extending from positive terminal 206 to negative terminal 208. Planar surfaces 214, 216 are substantially orthogonal to longitudinal axis 218.

III. Battery Arrangements

Battery compartments currently available today hold one or more batteries either in a laterally adjacent or a serially aligned manner. In the laterally-adjacent arrangement, the batteries are each electrically connected to a positive and negative device contact, while in the serially-aligned arrangement, the batteries are aligned with their longitudinal axes parallel or coextensive with each other. Batteries in this latter conventional arrangement are referred to herein as being "linearly aligned" with each other; that is, they form a straight line. In both arrangements, the longitudinal axes of an installed battery is also parallel or coextensive with a central axis of the conical coiled spring contact and an orthogonal surface vector of the device tab contact. Such arrangements dictate that conventional dry cell batteries 100 and miniature batteries 200 have planar surfaces 114, 116, 214, 216 that abut each other and/or a planar coil winding or tab device contact. As noted, the contact resistance between such linearly-aligned batteries can be significant due to the presence of an insulating contaminant layer that is disposed on the battery terminals. A similar phenomenon also occurs between the battery terminals and device contacts. Conventional approaches such as those noted above typically retrofit such existing battery compartments with additional parts that are designed to decrease contact resistance between the adjacent, linearly-aligned dry cell batteries. As noted, such supplemental parts add to the complexity of the battery compartment, and are often used improperly or not at all.

In contrast to such approaches, the present invention includes a battery compartment in which one or more batteries are arranged so that a minimal surface area of their respective terminals contacts each other. Specifically, the inventor has observed that existing dry cell batteries 100 and miniature batteries 200 have an edge on at least one of their terminals that is accessible by a planar, opposing-polarity terminal of an adjacent battery. Specifically, referring again to FIGS. 1A and 1B, positive terminals 106 of dry cell batteries 100 have, as noted, a curved or parabolic edge surface 112 around the periphery of planar positive terminal surface 114. Since positive terminal button 106 is raised from head portion 102 and the remainder of the positive terminal surface, edge 112 is accessible by a planar, opposing-polarity battery terminal or device contact that is nonparallel to the planar surface 114 of positive terminal 106. Referring again to FIGS. 2A and 2B, positive terminal 206 of miniature batteries 200 includes a casing with an accessible edge 212. Edge 212 is, as noted, a curved or parabolic surface around the periphery of planar positive terminal surface 214. Because edge 212 is on the periphery of the battery casing, edge 212 is a region of the positive terminal surface that is accessible by a planar, opposing-polarity battery terminal or device contact that is nonparallel to the planar surface 214 of positive terminal 206.

Battery compartments configured in accordance with the present invention arrange the installed batteries with terminal edges 112, 212 being the only point of contact between positive battery terminals 106, 206 and corresponding negative terminals 108, 208. By taking advantage of terminal edge 112, 212, the present invention reduces the area of contact between neighboring batteries as compared to the planar contacting surfaces 114 and 116, and provides a significant localized contact pressure between neighboring batteries 100, 200. This contact pressure is significantly greater that the contact pressure provided by conventional battery arrangements subject to the same compression force. The high pressure contact point ruptures an insulating contaminant layer on terminals 106, 108, 206 and 208. This, in turn, decreases the contact resistance between neighboring batteries installed in a battery compartment of the present invention. In certain embodiments, the contact resistance between the installed batteries and the device contacts is also reduced in a similar manner.

Figure 3:
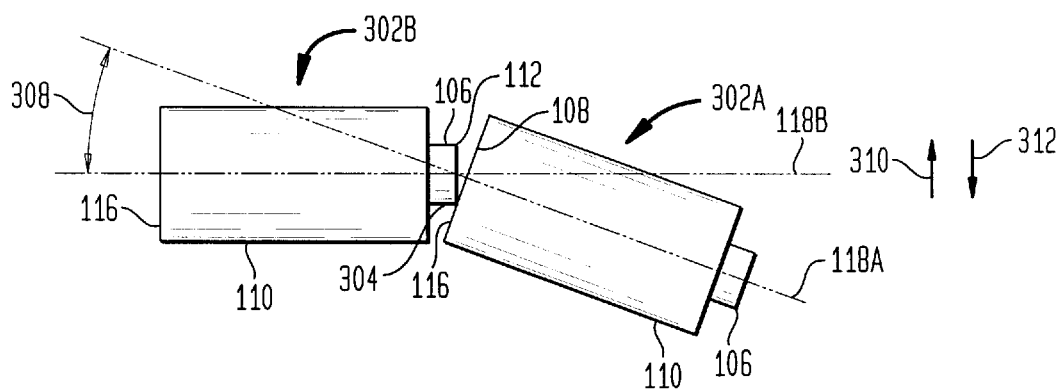
FIG. 3 is a schematic diagram of two dry cell batteries in a serially-aligned arrangement with their respective longitudinal axes intersecting in accordance with one embodiment of the present invention.
Figure 4:
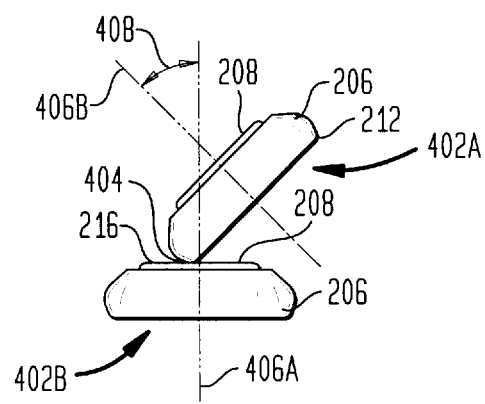
FIG. 4 is a schematic diagram of two miniature batteries in a serially aligned arrangement with their respective longitudinal axes intersecting in accordance with one embodiment of the present invention.
Figure 5:
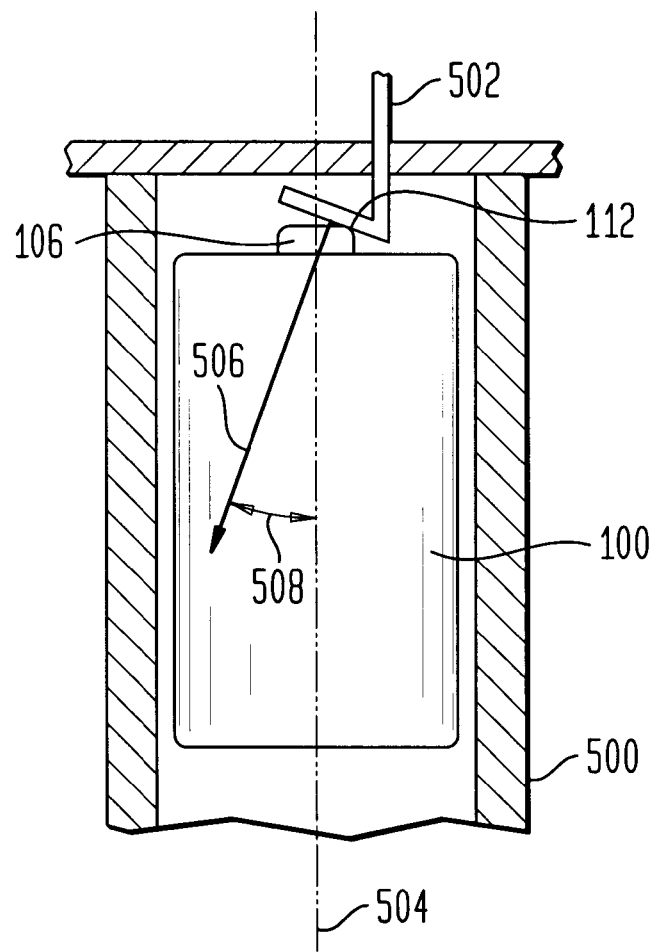
FIG. 5 is an illustration of a device contact tab in accordance with one aspect of the present invention.

FIGS. 3 and 4 are illustrations of two dry cell batteries and two miniature batteries, respectively, arranged in accordance with various embodiments of the present invention. FIG. 5 is a schematic diagram of a device contact and a dry cell battery arranged in accordance with another embodiment of the invention. Referring to FIG. 3, two dry cell batteries 100, labeled for ease of reference as batteries 302A and 302B in FIG. 3, are arranged in accordance with the present invention. Specifically, dry cell battery 302A is positioned in front of dry cell battery 302B. A terminal contact point 304 is the only point of contact between positive terminal 106 of battery 302B and negative terminal 108 of battery 302A. Terminal contact point 304 is that region of positive terminal edge 112 that contacts planar surface 116 of negative terminal 108. To achieve this, dry cell batteries 302 are arranged such that their longitudinal axes 118A and 118B intersect each other at a predetermined angle 308. Angle 308 ranges from an angle greater than that at which planar surfaces 114, 116 are parallel with each other, as in conventional arrangements (that is, zero degrees), and an angle less than that at which casings 110 contact each other and cause the separation of terminals 106, 108 (which varies with the dimensions of dry cell batteries 100).

Similarly, referring to the miniature battery arrangement illustrated in FIG. 4, two miniature batteries 200, labeled for ease of reference as batteries 402A and 402B in FIG. 4, are arranged in accordance with the present invention. Specifically, miniature battery 402A is positioned in front of miniature battery 402B. A terminal contact point 404 is the only point of contact between positive terminal 206 of battery 402B and negative terminal 208 of battery 402A. Terminal contact point 404 is that region of positive terminal edge 212 that contacts planar surface 216 of negative terminal 208. To achieve this, miniature batteries 402 are arranged such that their longitudinal axes 218A and 218B intersect each other at a predetermined angle 408. Angle 408 ranges from an angle greater than that at which planar surfaces 214, 216 are parallel with each other (that is, zero degrees), and an angle less than 90 degrees.

As will be described in detail below, battery compartments of the present invention also impart a relative lateral movement between adjacent battery terminals and/or between a battery terminal and device contact when the terminals and/or contacts come into contact with each other, preferably while under some compression force. This is illustrated with arrows in FIGS. 3 and 4. Referring to FIG. 3, one battery 302 can move in the direction of arrow 310 or 312 while the other battery 302 remains stationary or moves in the opposing direction 310, 312. In such aspects of the invention, the insulating contaminant layer disposed on the terminals is broken or otherwise penetrated by the resulting contact wiping action. Such a battery compartment is configured such that the batteries are serially-aligned and the device contacts are on opposing ends of the installed batteries. The distance between the opposing polarity device contacts is less than that of the total length of batteries that are installed therebetween. When the batteries are installed in the battery compartment, the batteries are pressed against the device contacts. The device contacts undergo elastic deformation providing the space necessary to enable the batteries to be installed in the battery compartment. Thereafter, the device contacts apply a spring force along the longitudinal axis of the batteries when the batteries are in their installed position in the battery compartment. This spring force compresses the batteries against each other, insuring the terminal-to-terminal and the terminal-to-device contacts are maintained. Such a relative lateral movement can be invoked during installation or at other subsequent times, such as in response to the activation of a mechanical switch, depending on the embodiment and application.

FIG. 5 is a schematic diagram of a contact tab configured in accordance with the present invention illustrating one implementation to reduce battery-to-device contact resistance. Referring to FIG. 5, in a dry cell battery compartment 500 configured in accordance with the present invention, a negative contact tab 502 is arranged so as not to be parallel with the surface 114 of positive battery terminal 106. Rather, device terminal tab 502 is positioned so as to contact only positive terminal edge 112 of an installed battery 100. This provides a contact point 304 between positive battery terminal 106 and negative device terminal 502 that imparts a greater contact pressure than would otherwise be imparted in conventional arrangements. The relative angles and other configuration details can be easily determined by those of ordinary skill in the art given the dimensions of battery 100.

IV. Conical Coiled Spring Contacts

Figure 6:
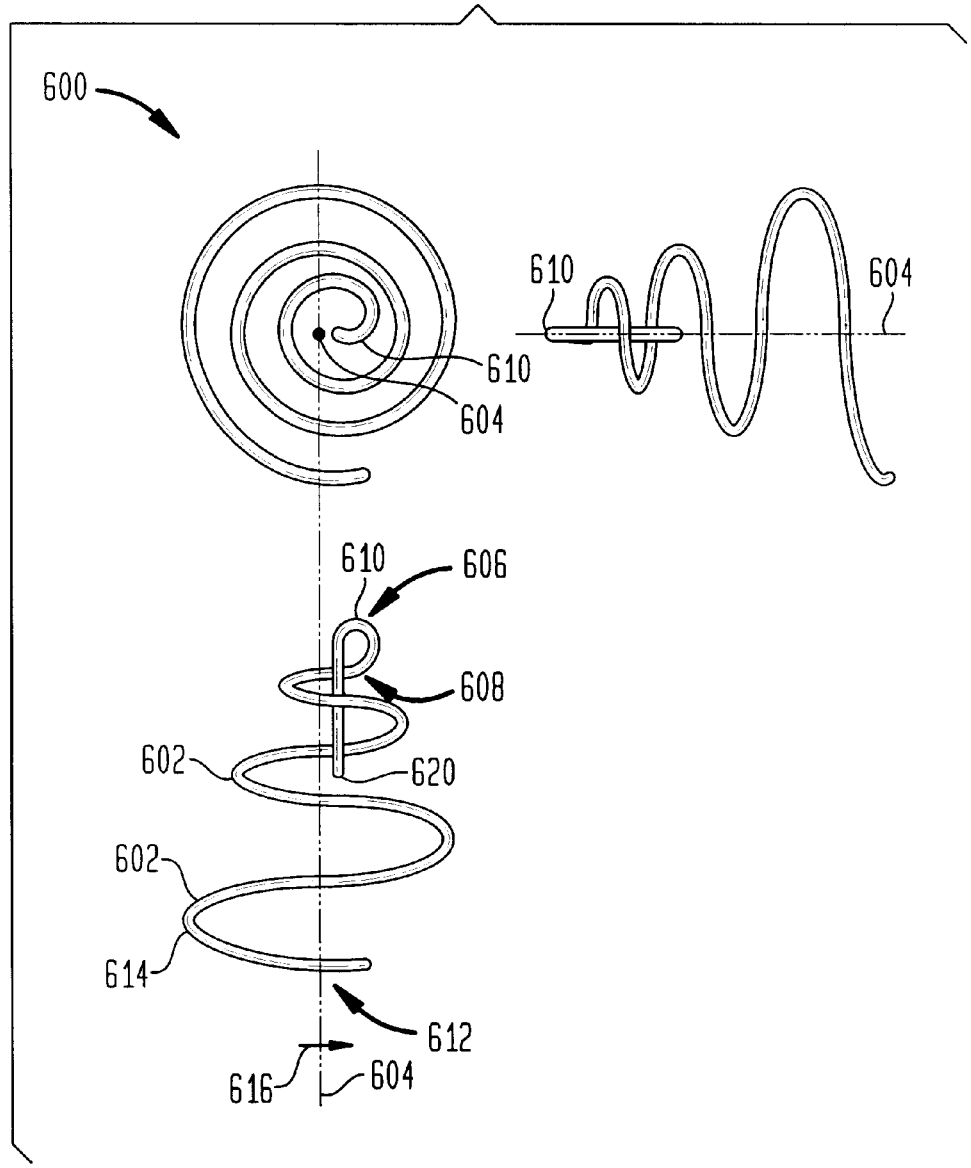
FIG. 6 includes a top, front and side views of a conical coiled spring device contact with an eccentric contact point in accordance with one embodiment of the present invention.

FIG. 6 includes side, top and front views of a conical coiled spring contact in accordance with one aspect of the present invention. Conical coiled spring contact 600 reduces or eliminates contact resistance between a battery terminal and conical coiled spring contact 600 by providing a high pressure contact point and, preferably, a contact wiping action that ruptures, scrapes or otherwise removes an insulting contaminant layer on an abutting battery terminal.

A conical coiled spring contact 600 of the present invention has a series of windings or convolutions 602. In the embodiment shown in FIG. 6, windings 602 each has a diameter that is greater toward a lower end turn 614 and smaller toward an upper end turn 608. As a result, the coiled spring contact 600 is approximately conical in shape. In alternative embodiments, the diameter of each winding 602 does not vary substantially or varies differently than that shown in FIG. 6. As shown in FIG. 6, the windings have a central axis of rotation 604. The axis of the conical coiled spring is preferably parallel to or coextensive with axis 118, 218 of the abutting battery 100,200.

Lower end turn 614 defines a bottom face 612 while upper end turn 608 defines top face 606 of conical coiled spring contact 600. Typically, bottom face 612 is secured to a region of an implementing battery compartment or circuit board while top face 606 contacts a battery 100, 200 installed therein. In contrast to conventional conical coiled spring contacts that, when compressed, maintains a flush contact between the surface along the length of the upper winding and the terminal surface, conical coiled spring contact 600 is configured with an upper end turn 608 that is bent to form a terminal contact region 610 for contacting negative terminal 108, 208 of dry cell batteries 100 or miniature batteries 200. Contact region 610 provides, for a given compression force, a contact point that imparts a pressure sufficient to rupture an insulating contaminant layer on the abutting battery terminals.

Furthermore, contact point 610 is eccentric; that is, contact point 610 is spaced laterally from axis 604 of conical coiled spring 600. As a result, as a battery 100, 200 compresses conical coiled spring contact 600, contact point 610 shifts laterally from its shown position in the direction of eccentricity 616. This imparts a lateral sliding motion against the abutting battery terminal that scrapes away a substantial portion of any existing insulating contaminant layer. In addition, as noted, contact point 610 thereafter provides a contact point that imparts a pressure sufficient to rupture any remaining insulating contaminant layer.

Conical coiled spring contact 600 is preferably formed of a highly conductive material, and is preferably unitary. In accordance with one aspect of the invention, a lead (not shown) is attached to distal end 620 of conical coiled spring contact 600 in any well-known manner. For example, a standard crimp-on connector is used in one embodiment. In another embodiment, the lead is soldered onto conical coiled spring 600 using any of a myriad of known techniques. In a further embodiment, an electrically conductive sleeve is securely connected to conical coiled spring 600. The sleeve has an interior diameter sufficient to receive and retain the lead.

This is in contrast to conventional techniques that connect the lead to the opposite end of the conical coiled spring contact; that is, to lower end turn 614. This conventional approach has been universally implemented because the lower end turn 614 is the portion of conventional spring contacts that is connected to the printed circuit board or battery compartment. In contrast, the present invention reduces substantially the significant bulk resistance of conical coiled spring contacts. For example, a typical conical coiled spring contact of a AA battery compartment uses 140–150 mm in length of 0.81 mm diameter wire. The resistance of such a coiled spring contact is approximately 0.211 ohms, 0.527 ohms, 0.337 ohms and 0.039 ohms when the spring contact material is 302 stainless steel, music wire, Be—Cu C17200 and Phosphor Bronze 521, respectively. The present invention reduces the length of the coiled spring contact through which current travels from the approximate 140–150 mm to approximately 4 mm by connecting the lead to distal end 620. This, in turn, reduces the bulk resistance of the conical coiled spring contact, for each of the noted materials, to 0.0055 ohms, 0.0139 ohms, 0.0044 ohms and 0.001 ohms, respectively. Furthermore, the conical coiled spring contact implementing this feature of the present invention can be used in place of conventional tab or leaf spring battery contacts due to the reduced bulk resistance. Such an application is cost effective because coiled spring contacts are significantly less expensive to manufacture than traditional dimpled leaf springs commonly used in conventional battery compartments. For example, the equipment to manufacture the conical coiled spring contact is significantly less expensive than the sheet metal die and related equipment to make the leaf springs. In addition, there is minimal material waste generated during the manufacturing process. Further, less material is used for each type of contact.

Figure 7A:
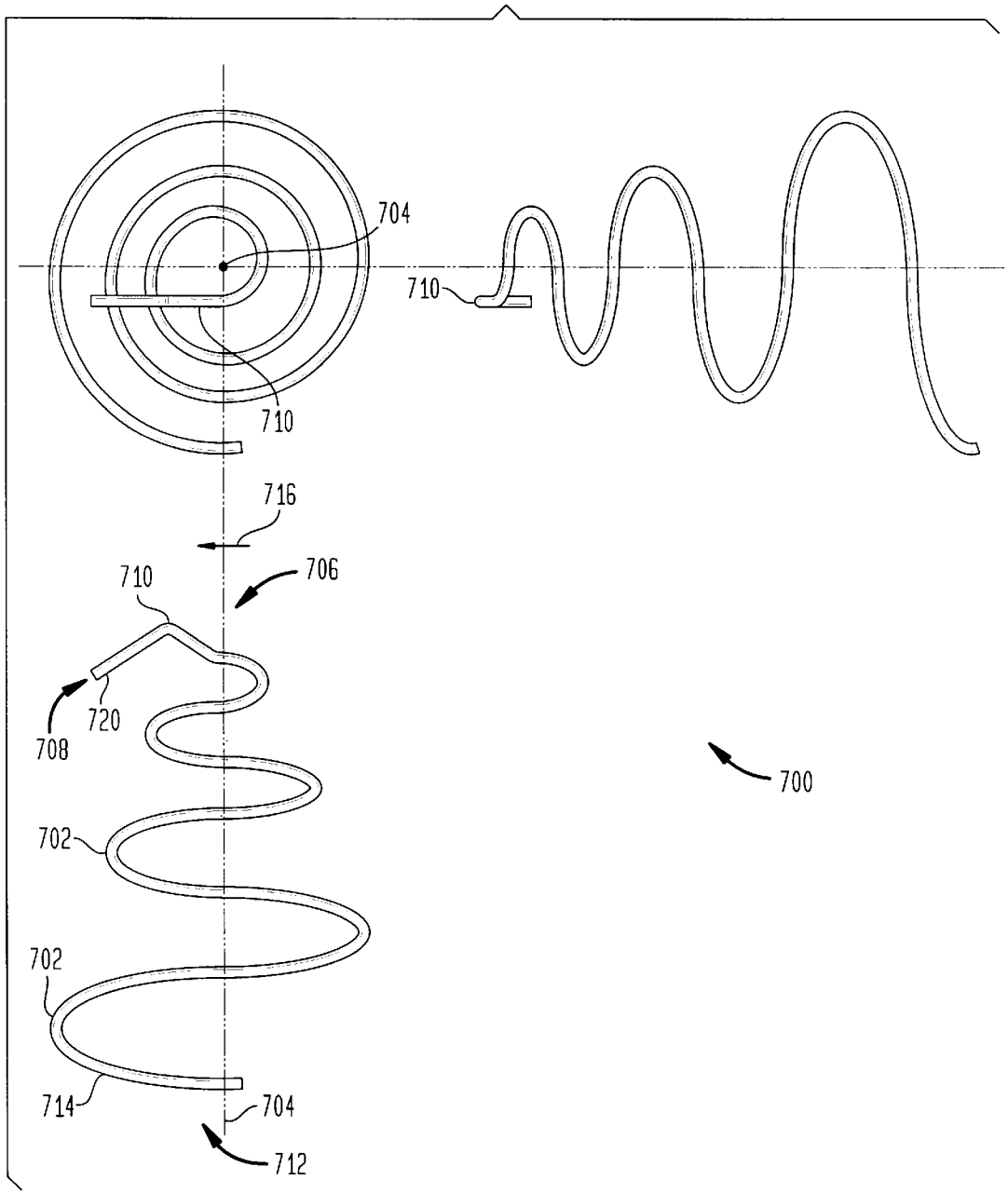
FIG. 7A includes a top, front and side views of a conical coiled spring device contact with an eccentric contact point in accordance with an alternative embodiment of the present invention.

FIG. 7A includes a side, top and front view of a conical coiled spring contact in accordance with an alternative embodiment of the present invention. As with conical coiled spring 600, conical coiled spring contact 700 reduces or eliminates contact resistance between an abutting battery terminal and conical coiled spring contact 700 by providing a high pressure contact point that ruptures, scrapes or otherwise removes an insulting contaminant layer on the contact 700 and abutting battery terminal.

Conical coiled spring contact 700 has a series of windings or convolutions 702. In the embodiment shown in FIG. 7A, conical coiled spring contact 700 is conical in shape although it can have other configurations. As shown in FIG. 7A, the windings 702 have a central axis of rotation 704.

A lower end turn 714 defines a bottom face 712 designed to be secured to a region of an implementing battery compartment while an upper end turn 708 defines top face 706 that contacts a battery 100, 200. Conical coiled spring contact 700 is configured with an upper end turn 708 that is bent to form an eccentric terminal contact point 710 for contacting negative terminal 108, 208 of dry cell batteries 100 or miniature batteries 200. Eccentric contact point 710 shifts laterally in the direction of eccentricity 716 as spring 700 is compressed, providing a lateral sliding motion against the abutting battery terminal and, thereafter, providing a high pressure contact point that can rupture an insulating contaminant layer on the abutting battery terminal.

Referring back to FIG. 6, contact point 610 of conical coiled spring contact 600 is formed with a hairpin upper end turn 608. As shown, distal end 620 of coil 600 is directed toward bottom face 612 along axis 604. Coiled spring contact 700 (FIG. 7) shows an alternative embodiment. Contact point 710 of conical coiled spring contact 700 is formed with a slight bend in upper end turn 708. The apex of this bend forms contact point 710. It should become apparent to those of ordinary skill in the art that in alternative embodiments, conical coiled spring contact can have other configurations that provide an eccentric contact point at top face 606, 706.

Figure 7B:
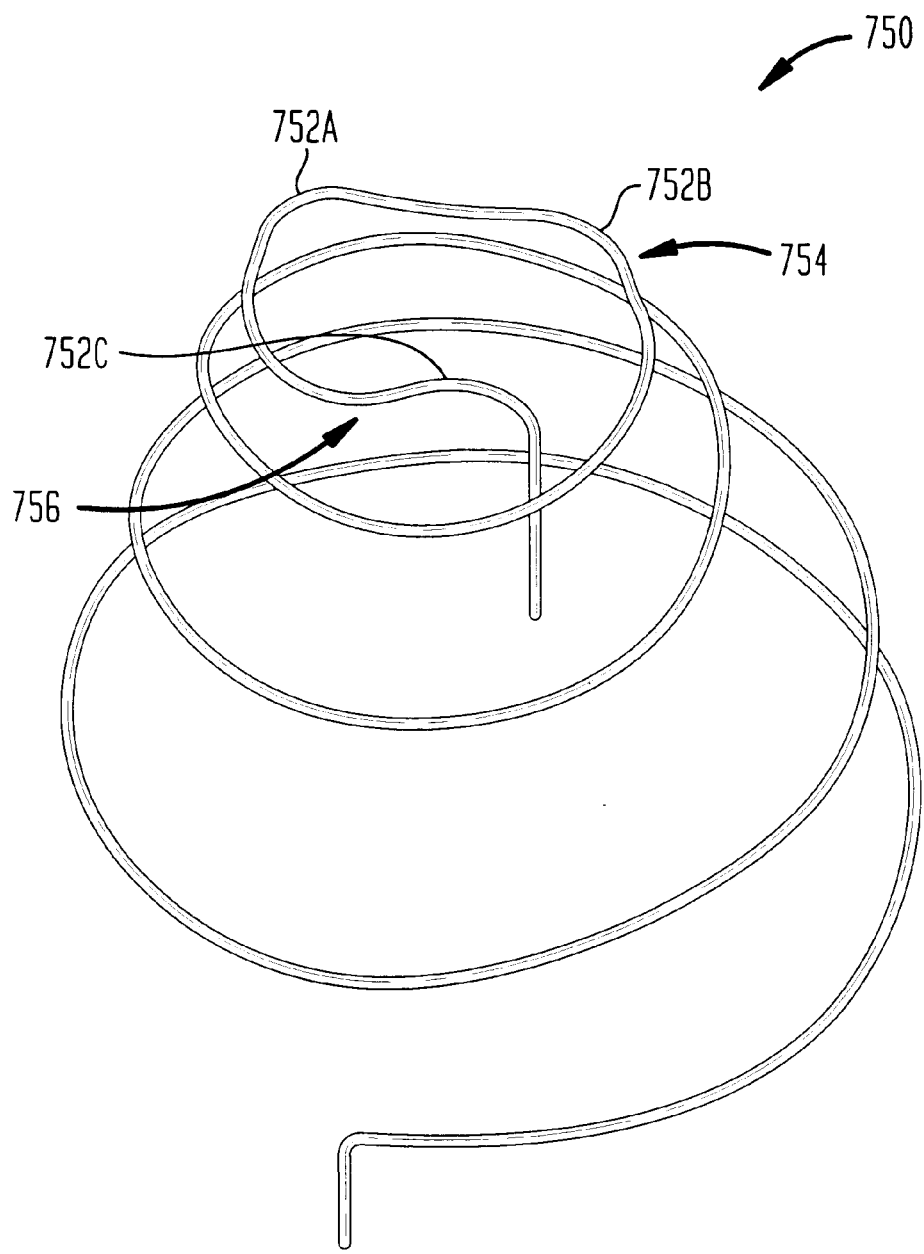
FIG. 7B is an isometric view of a conical coiled spring device contact with more than one eccentric contact point in accordance with an alternative embodiment of the present invention.

FIG. 7B is an isometric view of a conical coiled spring contact with more than one eccentric contact point in accordance with an alternative embodiment of the coiled spring contact of the present invention. Conical coiled spring contact 750 reduces or eliminates contact resistance between an abutting battery terminal and conical coiled spring contact 750 by providing multiple high pressure contact points 752 each of which ruptures, and preferably scrapes, an insulting contaminant layer on contact point 752 and abutting battery terminal.

Conical coiled spring contact 750 is constructed similarly to contacts 600 and 700. Accordingly, the similar details are not described further herein. However, in contrast to contacts 600 and 700, conical coiled spring contact 750 is configured with an upper end turn 756 with bends that form three eccentric terminal contact regions 752A–752C on upper face 754 for contacting an abutting battery terminal. The relative location on upper end turn 756 of each terminal contact point 752 can be selected to prevent or induce the lateral shift noted above with reference to contacts 600 and 700.

V. Battery Compartments

A. Battery Compartments for Dry Cells

Figure 8:
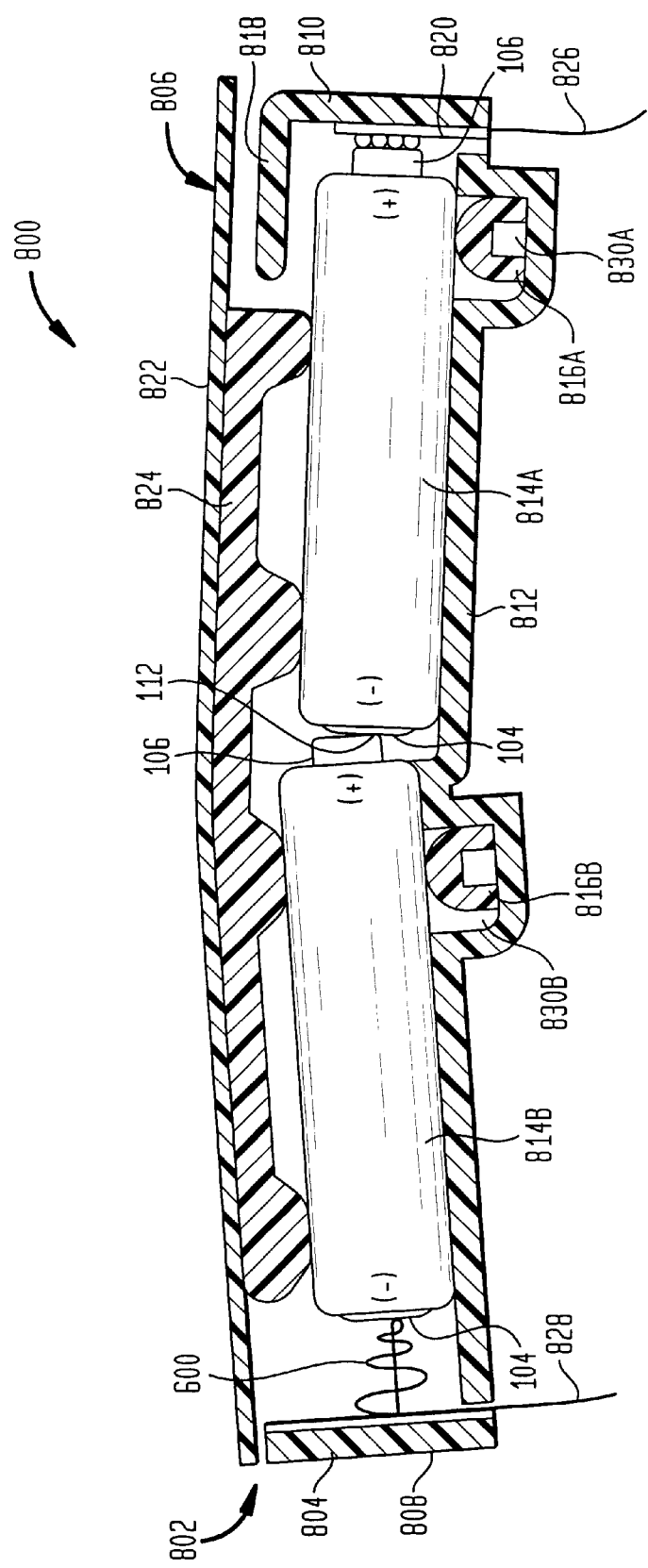
FIG. 8 is an illustration of a dry cell battery compartment that retains the batteries in a serially-aligned, intersecting longitudinal axis arrangement in accordance with one embodiment of the present invention.

As noted, in a dry cell battery compartment of the present invention the dry cell batteries are aligned with the longitudinal axes of neighboring batteries intersecting at an angle that results in the high pressure contact point of the positive terminal edge contacting the planar negative terminal of the neighboring battery. Such a battery compartment can have a number of configurations, some of which are described below. FIG. 8 is an illustration of a dry cell battery compartment in accordance with one embodiment of the present invention. Battery compartment 800 includes a housing 802 configured to receive two dry cell batteries 814A and 814B in a serially aligned arrangement. Dry cell battery 814A is in a forward position of compartment 800 while dry cell battery 814B is in a rear position. Housing 802 includes a housing base 804 with a housing door 806 together defining an interior region of compartment 800.

Housing base 804 includes a base floor 812 with an integral rear sidewall 808 and forward sidewall 810. Secured to rear sidewall 808 is a conical coiled spring 600. Conical coiled spring 600 contacts negative terminal 104 of battery 814B. Attached to conical coiled spring contact 600 is an electrical lead 828. Forward sidewall 810 has secured to it a fixed domed contact 820 for electrically contacting positive terminal 106 of forward battery 814A. A lead 826 is electrically connected to contact 820. Together, leads 828 and 826 provide current to the hosting device. Fixed domed contact 820 preferably has multiple contact domes each with a small radius to provide low contact resistance. In one embodiment, the domes are spaced closely and have a lead-in angle that prevents positive terminal 106 from being inadvertently retained within housing base 804. Conical coiled spring 600 has the structure and performs the functions as those noted above, while fixed domed contact is conventional. It should be understood, however, that both fixed domed contact 820 and conical coiled spring contact 600 can be replaced with contacts having other configurations.

In the embodiment illustrated in FIG. 8, batteries 814 are shown in the fully installed position, with the angle 308 between their longitudinal axes 118 (FIG. 1) being approximately 7 degrees. It should be understood, however, that this angle is by way of example only and that batteries 814 can be arranged such that the angle 308 between their longitudinal axes is some other angle. In this illustrative embodiment, this angle is maintained by securing the batteries 814 against a floor having different slopes. As shown, housing floor 812 has one region with a surface that supports battery 814A and a second region with a surface that supports battery 814B. The surface of housing floor 812 in each of these regions has a relative angle and configuration to maintain the batteries 814 with their longitudinal axes at the desired intersecting arrangement.

Housing floor 812 includes resilient supports 816A and 816B for supporting batteries 814A, and 814B, respectively. Resilient supports 816A and 816B reside in channel 830A and 830B, respectively. In an uncompressed state, supports 816 have a height slightly greater than the depth of the respective channel 830, extending above the surface of housing floor 812. Resilient supports 816 are made of an elastomeric or other flexible supporting material. Initially, batteries 814 are placed in housing base 804 loosely. First, battery 814A is installed against fixed contact 820. When installed, battery 814A rests on resilient support 816A, elevated temporarily off of the surface of housing floor 812. Forward sidewall 810 includes a cantilevered overhang 818 that extends over the location at which battery 814A is to be located. Overhang 818 provides the operator with a guiding surface for installing battery 814A. Then, battery 814B is installed against conical coiled spring 600 with its positive terminal 106 resting against negative terminal 104 of battery 814A. In this position, battery 814B rests on resilient support 816B, elevated temporarily off of floor 812.

In an alternative embodiment, resilient supports 816 are replaced with flat springs having a dome that extends through an aperture in housing floor 812 approximately at the location of channels 830 shown in FIG. 8. In such embodiments, the spring can be heat staked or otherwise secured to the exterior surface of housing base 804. Preferably, such a spring either is made of a plastic or coated with a non-electrically conductive coating. When implemented as springs, resilient supports 816 should not contact each other to prevent the springs from providing a conductive path should installed batteries 814 have a hole or other defect.

Housing door 806 includes a rigid structure 822 to which a battery compression member 822 is secured. Battery compression member 824 is configured to apply a compression force against batteries 814 when door 806 is closed. As door 806 is closed, battery 814A is pushed against housing floor 812, compressing resilient support 816A. In addition, battery 814A is pressed further against fixed contact 820. This causes a relative lateral movement between positive terminal 106 of battery 814A and fixed contact 820. As noted, when this is performed while under a force against contact 820, contact 820 ruptures substantially any insulating contaminant layer disposed on positive terminal 106. The disclosed embodiment of compression member 824 is nonconductive since it contacts simultaneously both installed batteries 814. In an alternative embodiment, springs or other flexible elements could be used. It should be understood, however, that if a conductive material is used, it should be implemented as two elements each of which contacts one battery 814 to prevent the establishment of a conductive path between the two battery casings.

Similarly, as door 806 is closed, battery compression member 824 applies a compression force against battery 814B, pushing battery 814B against conical coiled spring 600 and against resilient support 816B to ultimately rest on housing floor 812. Due to the axial force exerted by conical coiled spring 600, positive terminal 106 of battery 814B scrapes against the surface of negative terminal 104 of battery 814A as battery 814B travels toward floor 812. This causes a relative lateral movement between positive terminal 106 of battery 814B and negative terminal 104 of battery 814A, as well as between negative terminal 104 of battery 814B and conical coiled spring contact 600. As noted, this wipes or scrapes a significant portion of any insulating contaminant layer disposed on positive terminal 106 and negative terminal 104 of battery 814B.

As shown in FIG. 8, the points at which such a compression force is applied is at the head and tail regions of batteries 814. As one of ordinary skill in the art would find apparent, the locations at which such a compression force is applied, the sequence in which the force is applied as door 806 is closed, and similar operational features is a function of a number of factors. These factors include, for example, the number of batteries 814 in battery compartment 800, the configuration of the installed batteries, the manner in which housing door 806 engages housing base 804, etc. In one particular embodiment, housing door 806 is hinged to housing base 804 and includes a latch for securing one to the other. It should be understood that housing door 806 is sufficiently rigid such that when it is in its closed position, door 806 forces batteries 814 into housing base 804 as described above regardless of variations in battery tolerances.

Figure 9:
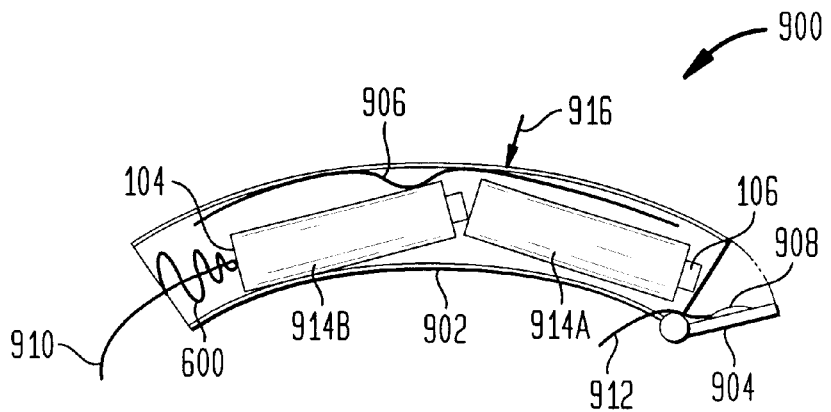
FIG. 9 is an illustration of a dry cell battery compartment that retains the batteries in a serially-aligned, intersecting longitudinal axis arrangement in accordance with one embodiment of the present invention.

FIG. 9 is a side view of an alternative embodiment of a battery compartment of the present invention. Battery compartment 900 has a curved housing 902 that holds two dry cell batteries 100 in a linearly-aligned, intersecting axis arrangement. A domed contact 908 is mounted on latched door 904 so as to contact positive terminal 106 of a battery 100 in position 914A when door 904 is latched to housing 902. A conical coiled spring contact 600 is mounted on the distal interior surface of housing 902 to contact negative terminal 104 of dry cell 100 in a position 914B. Leads 910 and 912 are connected to conical coiled spring contact 600 and domed contact 908, respectively.

Compartment housing 902 is curved such that batteries 100 contact each other as illustrated in FIG. 3 and described above. As door 904 is closed and dry cell 914A is forced against dry cell 914B, a spring 906 or other deformable material located in housing 902 causes a relative lateral movement of dry cells 914. Under the initial compression force, spring 906 deforms, allowing dry cell 914A to travel further into housing 902. Dry cell 914A then slides downward in the direction of arrow 916. This causes a relative lateral movement to occur between batteries 914A and 914B. Such a lateral movement causes edge 112 of dry cell 914B to scrape through the insulating contaminant layer on negative terminal 104 of dry cell 914A.

It should be appreciated that other mechanisms can be implemented with curved housing 902 to effect a desired relative lateral motion between batteries 914A and 914B. For example, in one alternative embodiment, a slide switch is mounted on housing 902 adjacent to tail region 104 of battery 914A. The slide switch travels in a slot substantially parallel with the longitudinal axes of batteries 914. A top portion of the slide switch is disposed on the exterior of housing 902 for manual access and control. A beveled protrusion of the slide switch is disposed in the interior of housing 902 adjacent to battery 914A. As the slide switch travels along the slot from a forward position (toward latched door 904) to a rear position (toward conical coiled spring contact 600), a larger portion of the beveled region becomes interposed between tail region 104 of battery 914A and the interior surface of housing 902. This results in a downward force in the direction of arrow 916, repositioning battery 914A in a downward direction. This causes a relative lateral movement between the two batteries 914A and 914B to occur. As noted, such a lateral movement causes edge 112 to scrape through a substantial portion of the insulating contaminant layer. Preferably, the slide switch is made of one or more non-conductive materials to prevent the sliding switch from breaking through the insulation on the battery case and causing a short.

Figure 10:
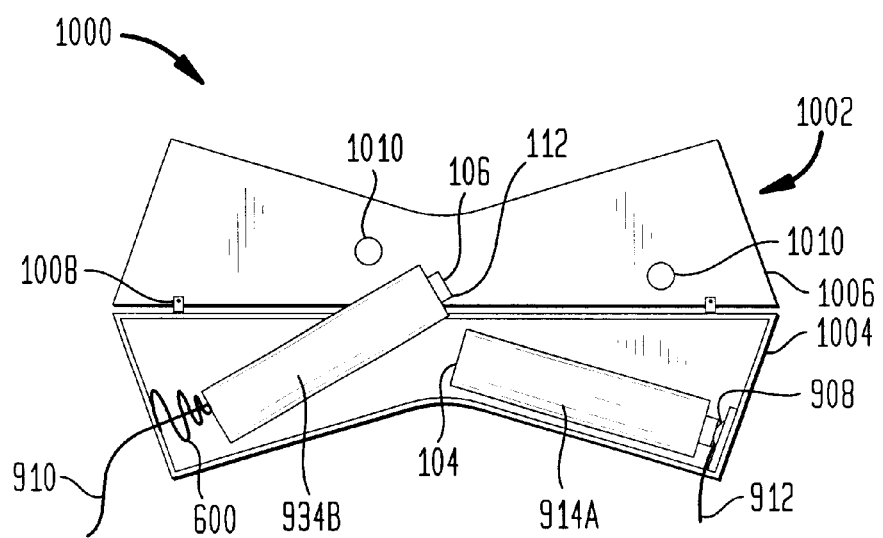
FIG. 10 is an illustration of a dry cell battery compartment that retains the batteries in a serially-aligned, intersecting longitudinal axis arrangement in accordance with one embodiment of the present invention.

FIG. 10 is a side view of another embodiment of a battery compartment of the present invention. Battery compartment 1000 includes a clamshell housing 1002. Housing 1002 is separated longitudinally into two halves: a bottom half 1002 for receiving batteries 914 and a top half 1006 hingedly connected to bottom half 1004. In this embodiment, a relative lateral movement is imposed on the installed batteries through the operation of the clamshell housing 1002. Bottom housing half 1004 receives batteries 914 in a partially installed position. Top half 1006 includes nonconductive extensions 1010 such as rubber posts, extending from the its interior surface toward bottom half 1004. As top housing half 1004 is rotated about hinges 1008 from an open position to a closed position, extensions 1010 come into contact with batteries 914, imparting a force on batteries 914 in direction 916. This force pushes battery 914B bottom half 1004 and into conical coiled spring 600. As conical coiled spring 600 is compressed, dry cell 914B rotates slightly, causing edge 112 of positive terminal 106 of dry cell 914B to forcibly travel against the surface of negative terminal 104 of dry cell 914A under a force applied by conical coiled spring contact 600.

B. Battery Compartments for Miniature Batteries

Figure 11A:
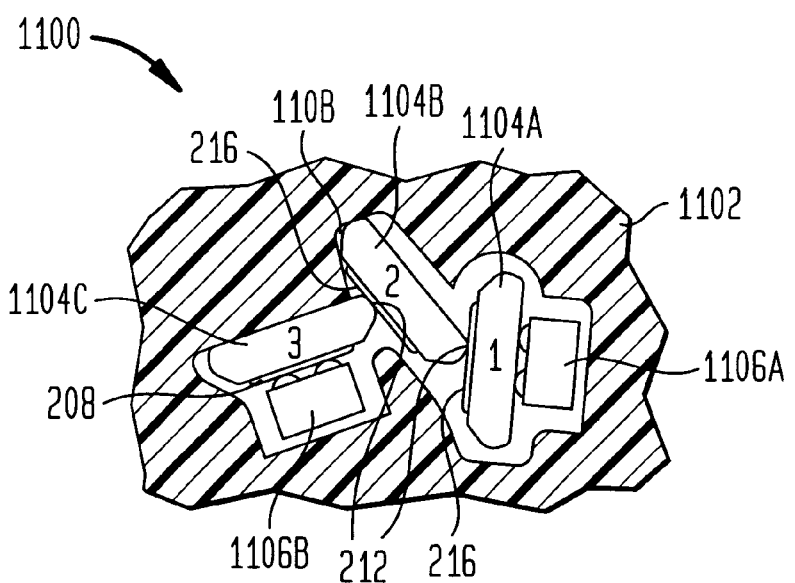
FIG. 11A is an illustration of a battery compartment for miniature batteries that retains the batteries in a serially-aligned, intersecting longitudinal axis arrangement in accordance with one embodiment of the present invention.

FIG. 11A is a schematic illustration of a battery compartment 1100 for miniature batteries in accordance with one embodiment of the present invention. In this particular embodiment, housing 1102 is configured to receive three miniature batteries 1104A–1104C. As shown, batteries 1104 are arranged such that edges 212 of batteries 1104B and 1104C provide a high pressure contact point against surfaces 216 of miniature battery 1104A and 1104C, respectively. This novel arrangement was introduced and described above with reference to FIG. 4.

It should be appreciated that the space provided in housing 1102 for each battery 1104 is sufficient to allow for maximum size of one battery and the minimum size of a neighboring battery. As such, the edges 212 may contact surface 216 at different locations depending on the particular batteries installed. To provide for minor adjustments to accommodate such variations in batteries 1104, housing 1102 provides a corner 1108 against which miniature battery 1104B pivots. In addition, space is provided between batteries 1104 and interior surface of housing 1102.

In the embodiment shown in FIG. 11A, a device domed contact 1104A is mounted in battery compartment 1100 to contact positive terminal 206 of miniature battery 1102A. As miniature battery 1104B pivots against corner 1108 the point at which it contacts surface 216 of miniature battery 104A will vary. Accordingly, domed contact 1104A is preferably a contact with widely spaced domes to insure that battery 1102A is maintained against battery 1102B. Another domed contact 1106B is provided in compartment 1100 to contact negative terminal 208 of miniature battery 1104C. Domed contact 1106B also should be of sufficient size to insure proper electrical contact between it and adjacent battery 1104C regardless of the size variations of all installed batteries 1104. It should also be appreciated that either or both domed contacts 1106 can be replaced by a conical coiled spring contact 600, 700 of the present invention, as described above.

Figure 11B:
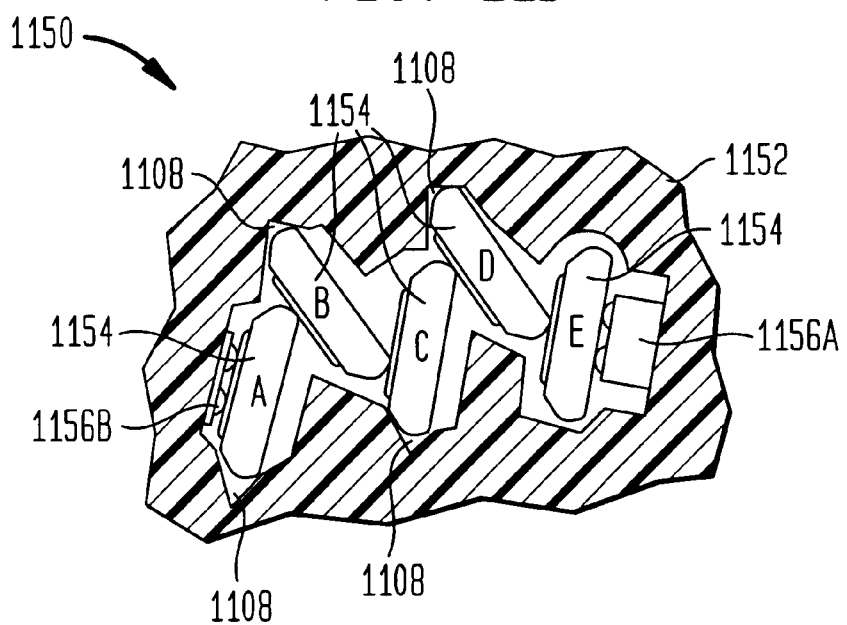
FIG. 11B is an illustration of a battery compartment for miniature batteries that retains the batteries in a serially-aligned, intersecting longitudinal axis arrangement in accordance with an alternative embodiment of the present invention.

FIG. 11B is an illustration of a battery compartment 1150 for miniature batteries in accordance with an alternative embodiment of the present invention. As shown, batteries 1154 are arranged such that edges 212 provide a high pressure contact point against surfaces 216 of an adjacent miniature battery. In this particular embodiment, housing 1152 is configured to receive five miniature batteries 1154. In this arrangement, a repetitive pattern is developed, with batteries 1154A and 1154B having the same relative position as batteries 1154C and 1154D, and batteries 1154B and 1154C having the same relative position as batteries 1154D and 1154E. A fixed domed contact 1156B is provided at one end of the arrangement while a flexible domed contact 1156A is provided at the other to maintain the batteries 1154 in contact with each other. Four pivot corners 1108 are provided to allow for minor adjustments and variations in battery sizes. It should be appreciated that the repetitive arrangement can be extended to include any number of batteries 1154.

VI. Exemplary Device Application

The battery compartment of the present invention can be implemented in any battery-powered device now or later developed. Any battery-powered device can benefit from the present invention. As noted, those devices that are most adversely effected by the noted contact resistance are high current devices. Examples include devices that have light attachments such as cameras, scanners, flash lights and VCRs; power tools such as power screw drivers, power drills, hedge trimmers, electric razors, and the like; and other types of battery-powered devices. It should be understood that this is not by limitation and that the present invention can be implemented on numerous other battery-powered devices. One such device, a scanner, is described below with reference to FIG. 12. FIG. 12 is a schematic block diagram a hand-held scanner implementing the battery compartment of the present invention. Scanner 1200 is any scanner such as the hand-held optical scanners available from Hewlett-Packard Company.

Scanner 1200 has a bell-shaped housing 1202 with a flat bottom surface 1216. Housing 1202 is designed to be easily grasped by a user. Generally, the user will hold housing 102 and manually drag scanner 1200 over a paper 1204 to scan to printed information presented thereon. Scanner 1200 includes a CCD 1206 with navigational illumination lights 1214. Navigation illumination devices 1214 are high power drainage devices that generate infrared light that is used by an image processing and data storage device 1208 to track the location of scanner 1200 on paper 1204. CCD 1206 picks up the information on the page 1204 and image processor 1208 reconstructs the image on the paper. A battery compartment 1212 is configured to receive two 1.2 volt, AA dry cell batteries. Power supply 1210 coverts the 2.4 DC voltage to a 5 and 12 volts DC for use by scanner 1200.

Due to the high power consumption of navigation illumination devices 1214, scanner 1200 draws approximately 5 amps. Without the present invention, scanner 1200 can deplete the two 1.2 volt batteries in 0.25–0.30 hours. A significant contributing factor to this rate of depletion is that the contact resistance between the two batteries is on the order of 0.2 ohms due to the presence of an insulating contaminant layer over the battery terminals. As such, 5 watts or 40% of the available 12 watts of power can be consumed overcoming the contact resistance. Implementing the present invention, however, reduces the contact resistance between abutting batteries to approximately 0.06 ohms; thereby reducing the power consumed overcoming the contact resistance to 1.5 watts. Similar scanners that operate at 2.5 amperes reduce the power losses at the terminal contacts from 1.25 watts to 0.38 watts, illustrating that devices with lower current requirements also benefit substantially from the present invention.

The present invention is related to commonly owned U.S. patent application entitled "CONICAL COILED SPRING CONTACT FOR MINIMIZING BATTERY-TO-DEVICE CONTACT RESISTANCE STEMMING FROM INSULATING CONTAMINANT LAYER ON SAME," naming as inventor Larry E. Maple, filed concurrently herewith, which is hereby incorporated by reference herein.

While various embodiments of the present invention have been described above, it should be understood that they have been presented by way of example only, and not limitation. For example, it should also be appreciated that although the noted dry cell and miniature batteries are described as being primary batteries, the present invention can also be used with secondary, or rechargeable batteries having the same or similar configuration. In the embodiments disclosed herein, the longitudinal axes of neighboring batteries both lie in the same imaginary plane. However, this need not be the case. That is, the longitudinal axes may not reside in the same plane. In other words, the longitudinal axes of the neighboring batteries may not only intersect at an angle in one plane or axis, but may also intersect at an angle in a second or third plane or axis. It should also be clear that the number of batteries is not restricted to those disclosed herein. For example, any number of dry cell batteries 100 can be serially aligned, each having the relative arrangement with its neighbor as noted above. Thus, the breadth and scope of the present invention should not be limited by any of the above-described exemplary embodiments, but should be defined only in accordance with the following claims and their equivalents.

What is claimed is:

1. A battery compartment configured such that opposing polarity terminals of adjacent batteries contact each other, wherein the batteries are arranged such that a region of one of the terminals that defines a minimum accessible portion of the terminal surface area is the only point of contact between the two contacting terminals.

2. The battery compartment of claim 1, wherein the batteries comprise first and second dry cell batteries and said minimum accessible portion of the terminal surface area is an edge of a positive terminal button of said first battery.

3. The battery compartment of claim 1, wherein the batteries comprise first and second miniature batteries, and said minimum accessible portion of the terminal surface area is an edge of a positive terminal casing of said first battery.

4. The battery compartment of claim 2, wherein the first and second batteries each have a casing with positive and negative terminal surfaces on opposing ends of the batteries, said casings defining a longitudinal battery axis substantially orthogonal to each terminal surface, wherein when installed, the longitudinal axes of the first and second batteries lie in a same plane and intersect each other.

5. The battery compartment of claim 3, wherein the first and second batteries each have a casing with positive and negative terminal surfaces on opposing ends of the batteries, said casings defining a longitudinal battery axis substantially orthogonal to each terminal surface, wherein when installed, the longitudinal axes of the first and second batteries lie in a same plane and intersect each other.

6. The battery compartment of claim 1, wherein the battery compartment is constructed and arranged to cause said region of said minimally accessible surface area of one of the adjacent batteries to forcibly scrape against said negative terminal of the other one of the adjacent batteries.

7. A battery compartment for at least two batteries each having a casing with positive and negative terminal surfaces on opposing ends thereof, said casing of each said battery being transected by a longitudinal battery axis substantially orthogonal to said positive and negative terminal surfaces, wherein the installed batteries are serially aligned in terminal contact with each other such that their respective longitudinal axes intersect each other.

8. The battery compartment of claim 7, wherein the at least two batteries includes a first and a second battery, wherein said positive terminal of said first battery is in contact with a negative terminal surface of said second battery, wherein said negative terminal surface of said second battery is not parallel with said positive terminal surface of said first battery when said first and second batteries are installed in the battery compartment.

9. The battery compartment of claim 7, wherein said batteries are dry cell batteries.

10. The battery compartment of claim 9, wherein said positive terminal surface of said first battery is in the form of a button protruding from said casing, said button having a substantially planar top surface with a edge around the periphery thereof, and wherein said region of said positive terminal surface is said edge of said positive terminal button.

11. The battery compartment of claim 7, wherein said batteries are miniature batteries.

12. The battery compartment of claim 11, wherein said positive terminal surface includes a casing of said miniature batteries, wherein said region of said positive terminal is an edge of said casing.

13. The battery compartment of claim 8, wherein the battery compartment is constructed and arranged to cause said region of said positive terminal to forcibly scrape against said negative terminal of said second battery.

14. The battery compartment of claim 9, further comprising:

positive and negative device contacts installed in opposing ends of the battery compartment to contact a positive terminal of a battery last in the series of one of the at least two installed batteries and a negative terminal of a battery first in the series of one of the at least two installed batteries.

15. The battery compartment of claim 14, wherein said device contacts comprise a tab negative contact having an orthogonal surface vector that intersects said longitudinal axis of one of the at least two installed batteries.

16. A battery-powered device comprising:

a power consuming component; and a battery compartment for electrically connecting at least two standard dry cell batteries in a serially aligned arrangement, each said dry cell battery including a casing with a substantially planar negative terminal surface and a raised positive terminal button with a planar top surface and edges around the periphery thereof, wherein only said positive terminal button edge of a battery in a second series battery position contacts said substantially planar surface of a negative terminal of a battery in a first series battery position.

17. The battery-powered device of claim 16, wherein a longitudinal axis of said second battery intersects a longitudinal axis of said first battery.

18. The battery-powered device of claim 17, wherein the battery compartment is constructed and arranged to cause said positive terminal edge of said battery in said second series battery position to forcibly scrape against said negative terminal of said battery in said first series battery position as said batteries are installed into the battery compartment.

19. The battery-powered device of claim 18, wherein said battery compartment further comprises:

a positive device contact secured in said battery compartment so as to contact said negative contact of said battery in said second series battery position, and a negative device contact secured in said battery compartment so as to contact said positive contact of said battery in said first series battery position.

20. The battery-powered device of claim 19, wherein said negative device contact is a tab contact having an orthogonal surface vector that intersects said longitudinal axis of said battery installed in said first series battery position.

* * * * *